United States Patent
Yadav et al.

(10) Patent No.: US 10,417,099 B1
(45) Date of Patent: Sep. 17, 2019

(54) RESILIENT BACKUPS FOR LARGE HYPER-V CLUSTER SHARED VOLUME ENVIRONMENTS

(71) Applicant: EMC IP Holding Company LLC, Hopkinton, MA (US)

(72) Inventors: Sunil Yadav, Bangalore (IN); Soumen Acharya, Bangalore (IN); Anupam Chakraborty, Bangalore (IN); Tushar Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 384 days.

(21) Appl. No.: 14/814,235

(22) Filed: Jul. 30, 2015

(51) Int. Cl.
  *G06F 16/11* (2019.01)
  *G06F 11/14* (2006.01)
  *G06F 9/455* (2018.01)

(52) U.S. Cl.
  CPC ...... *G06F 11/1464* (2013.01); *G06F 9/45558* (2013.01); *G06F 11/1451* (2013.01); *G06F 16/113* (2019.01); *G06F 2009/45583* (2013.01); *G06F 2201/84* (2013.01)

(58) Field of Classification Search
  CPC .................................................. G06F 16/113
  See application file for complete search history.

(56) References Cited

U.S. PATENT DOCUMENTS

| | | | | |
|---|---|---|---|---|
| 8,219,769 | B1* | 7/2012 | Wilk | G06F 11/1464 |
| | | | | 707/640 |
| 8,347,380 | B1* | 1/2013 | Satish | G06F 11/00 |
| | | | | 708/200 |
| 8,966,318 | B1* | 2/2015 | Shah | G06F 11/3664 |
| | | | | 714/28 |
| 9,081,617 | B1* | 7/2015 | Pendharkar | G06F 9/5044 |
| 9,201,887 | B1* | 12/2015 | Earl | G06F 17/30088 |
| 9,317,326 | B2* | 4/2016 | Ramanathan | G06F 9/45533 |
| 9,471,441 | B1* | 10/2016 | Lyadvinsky | G06F 11/1464 |
| 9,703,641 | B1* | 7/2017 | Viswanathan | G06F 11/1451 |
| 2004/0039729 | A1* | 2/2004 | Boger | G06F 17/30463 |
| 2004/0049541 | A1* | 3/2004 | Swahn | G06F 17/30905 |
| | | | | 709/203 |
| 2005/0216665 | A1* | 9/2005 | Takakuwa | G06F 3/0613 |
| | | | | 711/114 |
| 2008/0222373 | A1* | 9/2008 | Garimella | G06F 11/1435 |
| | | | | 711/161 |

(Continued)

*Primary Examiner* — Robert W Beausoliel, Jr.
*Assistant Examiner* — Nirav K Khakhar
(74) *Attorney, Agent, or Firm* — Staniford Tomita LLP (57) ABSTRACT

Embodiments are directed to a large-scale data backup system and method. A backup process accesses a defined policy defining how the virtual machines are to be grouped into a plurality of groups, and groups the plurality of virtual machines into the plurality of groups according to the defined policy with each group containing a number of virtual machines that can be backed up in a single backup operation without causing a system error. It then takes a snapshot backup of each group of the plurality of groups in a respective data rollover operation, and saves the snapshot backup of each group to a storage media. The policy may be a user-defined policy or a dynamic system-defined policy, and may be based on characteristics such as total number of virtual machines, system characteristics, and backup system constraints.

20 Claims, 6 Drawing Sheets

(56) References Cited

U.S. PATENT DOCUMENTS

| | | | |
|---|---|---|---|
| 2011/0072138 A1* | 3/2011 | Canturk | G06F 9/5011 709/226 |
| 2014/0053226 A1* | 2/2014 | Fadida | H04L 67/34 726/1 |
| 2014/0157261 A1* | 6/2014 | Toeroe | G06F 11/1482 718/1 |
| 2014/0196038 A1* | 7/2014 | Kottomtharayil | G06F 9/505 718/1 |
| 2015/0149999 A1* | 5/2015 | Ramanathan | G06F 9/4856 718/1 |
| 2015/0168144 A1* | 6/2015 | Barton | G01C 11/02 348/144 |

* cited by examiner

| USER-DEFINED | DYNAMIC |
|---|---|
| Group VMs based on Priority of VMs | Number of VMs to be backed up and Value of Vmax |
| Group VMs based on Equal Distribution | CSV involved in Backup |
| Group VMs based on Condition of VMs | CSV size |
| Group VMs based on Other Criteria | CSV ownership |

RESILIENT BACKUPS FOR LARGE HYPER-V CLUSTER SHARED VOLUME ENVIRONMENTS

TECHNICAL FIELD

Embodiments are generally directed to networked-based data backup methods, and more specifically to resilient backup methods for virtual machines organized into cluster shared volume environments.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. The advent of virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss. The immense amount of data involved in large-scale (e.g., municipal, enterprise, etc.) level backup applications and the number of different potential problems that exist means that backup performance and reliable operation is a critical concern for system administrators.

Virtualized storage systems, such as Hyper-V servers are being rapidly and increasingly deployed in customer's environments. In order to achieve high availability Hyper-V virtual machines are often configured in a clustered environment with the data stored on CSV (cluster shared volume) based systems. The size of these deployments is growing by the day, thus introducing significant challenges in protecting these expanding deployments. As the environments scale upwards, there is a need to increase the number and size of CSV volumes. In large environments, it has been observed that backup operations often fail for snapshot creation operations. In Microsoft VSS (virtual shadow copy service) frameworks, such systems commonly generate a timeout error. In this implementation scenario, the backup application typically uses a standard VSS workflow for snapshot operation. If the VSS framework is unable to take a snapshot of a scaled out environment with an overly large number of CSV disks, it reports a backup failure with an error code (e.g., 0x80780021) that indicates that the Windows backup timed-out before the shared protection point was created.

Thus, in a customer scaled out environment where there are thousands of virtual machines configured for high availability, with such a large number of CSVs, it is important to ensure that all VMs that can be backed up are protected by eliminating such timeout issues that are often seen for such huge environments. What is needed, therefore, is a backup method that uses existing VSS framework but implements different policies that can be used to make sure that the backup operation does not fail with timeout errors.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
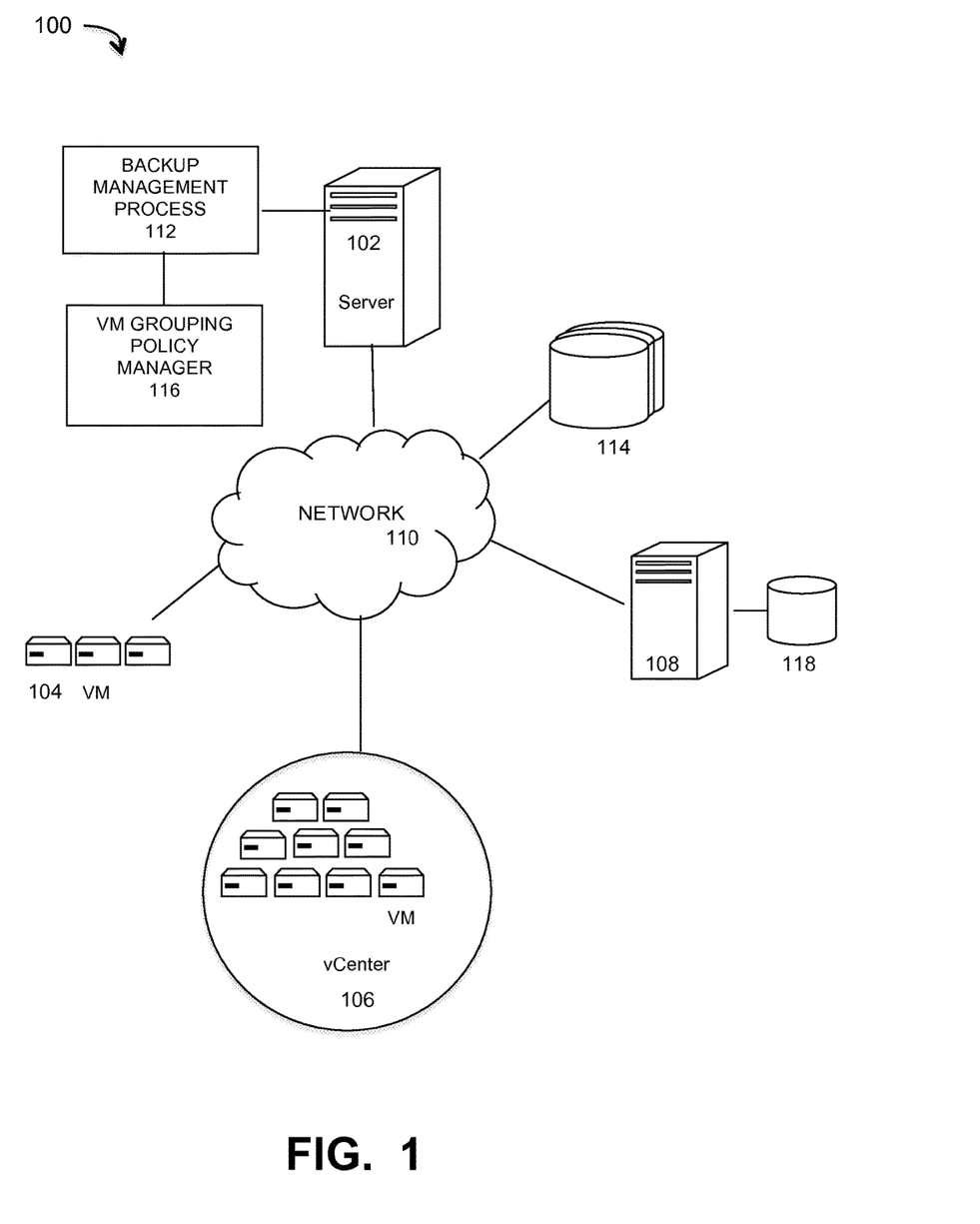
FIG. 1 is a diagram of a large-scale network implementing a VM grouping manager that provides resilient backups in CSV environments, under some embodiments.

FIG. 1 illustrates a computer network system 100 that implements one or more embodiments of grouping policy manager method and system for resiliently backing up virtual machines VMs in a large-scale computer network. In system 100, a number of VMs or groups of VMs 104 are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a data backup process with virtual disk block consolidation for optimized storage space utilization. The backup management process 112 automates the backup of network data using the target VM devices. In an embodiment, the process 112 uses certain known full and incremental (or differencing) backup techniques along with a snapshot backup process that is used to store an image or images of the system(s) to be backed up prior to the full or incremental backup operations. System 100 also includes a process or system component 116 that implements policies that group VMs within the system so that the possibility of time out errors due to an excessive number of VMs being backed up at any one time is reduced.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

As is known, virtual machine environments utilize hypervisors (e.g., Hyper-V) to create and run the virtual machines. A computer running the hypervisor is a host machine and all virtual machines are guest machines running guest operating systems (OS). The hypervisor provides the guest operating systems with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created.

FIG. 1 is a diagram of a large-scale network implementing a VM grouping manager 116 that provides resilient backups in CSV environments, under some embodiments. For this embodiment, the virtual machines 104 and/or 106 support or implement cluster shared volumes (CSV) which is a feature of failover clustering for use with the Hyper-V system. In general, a CSV is a shared disk contain an NTFS or ReFS volume that is made available for read/write operations by all nodes within a failover cluster. CSV generally enables a VM complete mobility throughout a cluster as any node can access the VHD files on the shared volume. CSV allows large numbers of VMs to be accessed off a common shared disk and increases resiliency of the cluster by having I/O (input/output) fault detection and recovery use alternate communication paths between nodes. In a CSV system, a VM is configured and the associated VHDs are created on or copied to a CSV disk. Multiple VHDs can be placed on a CSV, and CSVs can be associated with multiple VMs that can be running on different nodes in the cluster.

In many present applications, deployed customer Hyper-V high availability environments are very huge with a very large number of virtual machines (VM) distributed in a cluster environment, such as in a cloud network. For example, on the order of thousands to tens of thousands of VMs may be present in a CSV. Data for these VMs reside on CSV to attain high availability, and backup applications typically use the Microsoft Virtual Shadow copy service (VSS) framework to protect this private cloud infrastructure. These virtual machines can be critical machines that are required to be backed up in accordance with a regular (and sometimes frequent) schedule. In this distributed and scaled up environment the number and size of CSVs can be very large. The VSS framework can be used to backup this environment, but in general Hyper-V servers and VSS processes were not initially meant to support networks with very large numbers of VMs. In such a case, it is often observed that backup operation fail, such as due to VSS timeout failures. This causes entire backup operation to fail and none of the virtual machine in the environment may be backed up in such a case, which leads to unprotected network environments and great vulnerability. Moreover the timeout error may not be reported until after a considerable time which further compromises system security and increases the backup window gap.

In an embodiment, the policy manager 116 leverages the VSS framework to implement policies that can be applied in backup applications to make sure that there are no backup failures due to VSS timeout errors, or other similar errors. In general, VSS is an operating system (e.g., Microsoft Windows) resident service that allows the system to make snapshots of computer files or volumes even when they are in use. It is used in conjunction with a file system (e.g., NTFS) that is able to create and store shadow copies of files or volumes. A snapshot backup is a read-only copy of a volume at a particular point in time. Snapshots allow for the creation of consistent backups of a volume and ensure that contents do not change and are not locked while the backup is in progress. Snapshots are typically the first step in any incremental or full backup session, and the VSS service initiates and manages the snapshot creation process.

Figure 2:
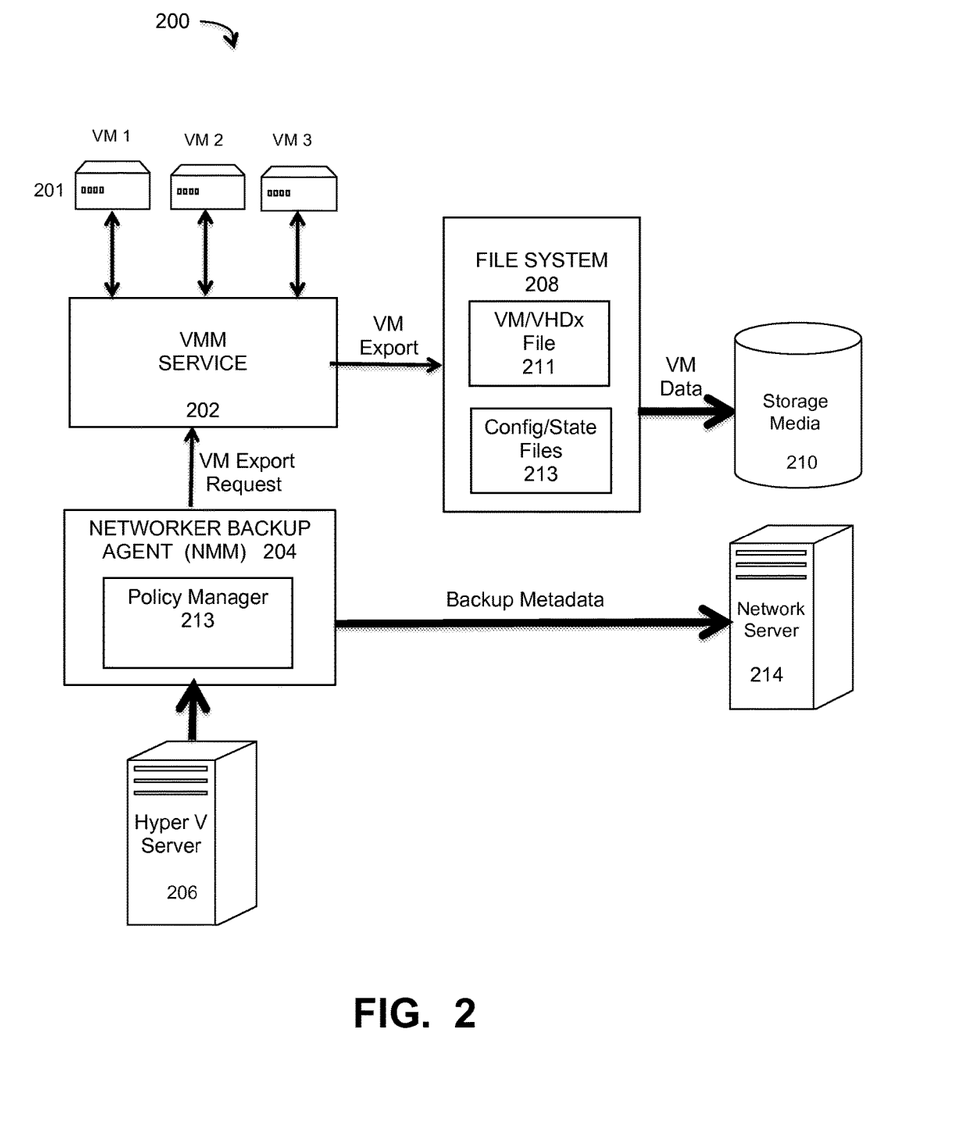
FIG. 2 illustrates a Hyper-V system that implements a VM grouping policy manager, under some embodiments.

In an embodiment, the backup system 100 implements a Hyper-V hypervisor that creates virtual machines on certain computer systems, such as x86-64 and Windows-based systems. In such an embodiment, a Hyper-V server computer is configured to expose individual virtual machines to one or more networks. FIG. 2 illustrates a Hyper-V system that implements a VM grouping policy manager, under some embodiments. As shown in system 200 of FIG. 2, a number of VMs 201, denoted VM1 to VM3 but scalable to any practical number (e.g., thousands) are managed by a Hyper-V server 206 through a virtual machine management service (VMMS) 202. A backup agent or process 204, also referred to as an "NMM" (Networker Module for Microsoft) initiates and executes one or more backup tasks and sessions, such as full or incremental backups of the volumes and files of the VMs 201. Upon initiation of a backup operation, the backup agent 204 sends a VM export request to the VMM service 202. The VM data is exported through the appropriate file system 208 including VM/VHDx files 211 and/or configuration/state files 213 for storage on appropriate storage media 210 (e.g., RAID disks). The VM file and volume data may be associated with metadata, and the backup metadata can be stored directly on a server computer, such as an EMC Networker server 214.

In an embodiment, the backup agent 204 implemented by the Hyper-V server makes snapshot backups during any backup operation and utilizes the VSS service for creating shadow copies during the snapshot backup operations. In many present systems, the number of VMs is typically very large (hundreds to thousands of VMs), in which case a snapshot image of all the VMs at once is often enough to overwhelm the VSS service. This creates a backup failure that is typically manifested as a VSS reporting timeout error. Such an error code may be represented in the Windows OS as a 0x80780021 error code indicating that the backup session timed out before the shared protection point was reached. Other timeout errors or backup failure or suspension errors may also be possible. In an embodiment, the network backup system 200 includes a VM grouping policy manager 213, that divides and organizes the VMs 201 into subsets or sub groups so that a smaller number of VMs are exposed for snapshot backups at any one time so that the risk of timeout errors due to too many VMs backed up at once is reduced if not eliminated. The policy manager process 213 may be functionally implemented as part of the backup agent process or component 204 (as shown in FIG. 2), or it may be implemented as a standalone process in system 200, or as part of another component, such as the VMM service 202, or other Hyper-V server 206 process.

The backup storage server 206 includes interfaces to other VM-based backup targets to store data backed up from a data source or other clients. The backed up data may include a volume, portion of a volume, applications, services, user-generated or user data, logs, files, directories, databases, operating system information, configuration files, machine data, system data, and so forth. For system 200, the VMs include volumes that store information that needs to be backed up through a backup operation executed by the backup agent 204. Volumes may be associated with a database or repository or other data source, and the backup process backs up each virtual machine, which are represented as virtual disks. The file system 208 may be configured to store any and all back up information related to the virtual disk files, and the files containing the VM data may be created based on a virtual disk format and may contain information typically contained in a physical volume. For some embodiments, the files may be created based on the Hyper-V Virtual Hard Disk (VHDX) format according to the VHDX Format Specification, published by Microsoft Corp. and may be referred to as VHDx files and may be mounted by an operating system that supports VHDx files. The backup operation may be a block based backup (BBB) operation, in which the data is read from the volume block-by-block regardless of the number of files stored in the volume.

In an embodiment, the policy manager 204 allows the backup agent 204 to implement different policies to overcome VSS timeout (or other) backup issues, and gives the end user a resilient backup solution. It provides methods that enable Hyper-V resilient backups for scaled-out environments having very large numbers of CSV volumes, where "large" is generally defined as a number of VMs above which a single backup operation will fail due to too many volumes. This manager makes sure that all VMs in a distributed Hyper-V environment are always protected by allowing for certain backups of subsets of VMs within an entire network.

Figure 3:
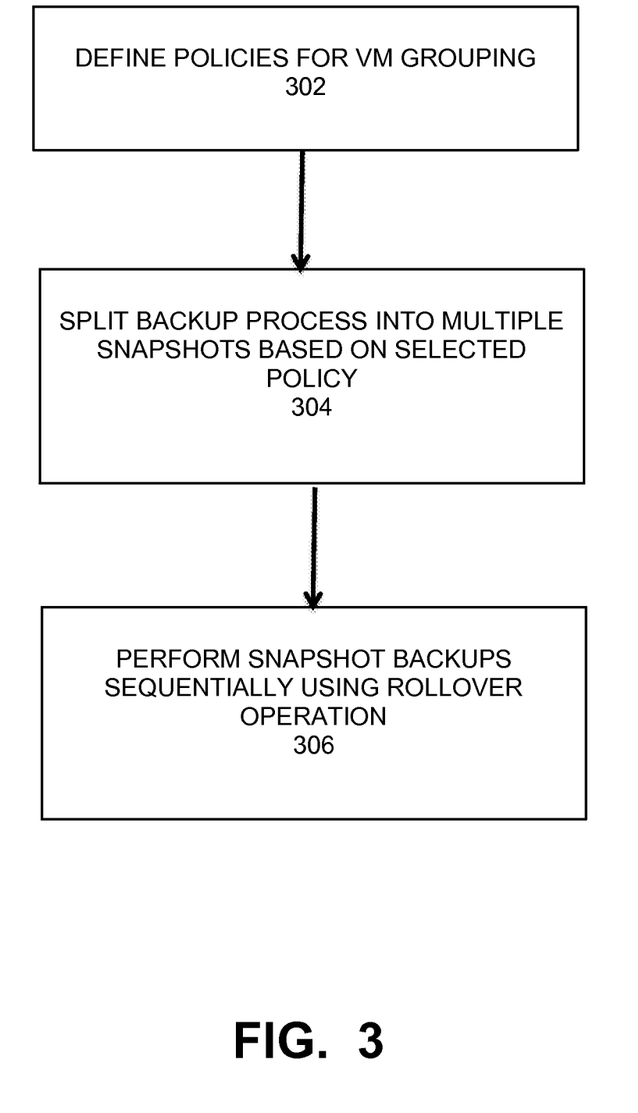
FIG. 3 is a flow diagram illustrating main process components ofa VM grouping policy manager, under some embodiments.

FIG. 3 is a flow diagram illustrating main process components of a VM grouping policy manager, under some embodiments. In a step 302, certain policies governing the grouping of VMs or VM volumes are defined. The policies that can be applied for backup include one or more user defined policies or dynamic policies. User defined policies comprise policies wherein the user (or system administrator or other personnel) specifies the grouping of the VMs in accordance with any suitable criteria. For example, the user may specify the grouping according to the priority of virtual machines, in which e.g., high priority virtual machines can be grouped into one or more first groups, and lower priority virtual machines can be grouped into one or more later groups. Dynamic policies are policies that are set after the backup process (NMM) 204 has already gathered information about the distributed environment. This information includes relevant information such as the number of VMs participating in a backup session, the data characteristics (e.g., amount, type, etc.) on each VM, the CSV involved for backup, the size of CSV, CSV ownership, and other similar factors. The backup agent 204 will then use this information to group virtual machines so that it can take optimal time to perform backup operation. As stated above, in an embodiment, a CSV is a standard cluster disk containing NTFS volumes that are made accessible for read and write operations by all nodes within the cluster. This gives the cluster complete mobility throughout the cluster as any node can be an owner, and changing owners is a straightforward procedure. A cluster owner node is the physical server to which the virtual cluster name gets resolved.

Figure 4:
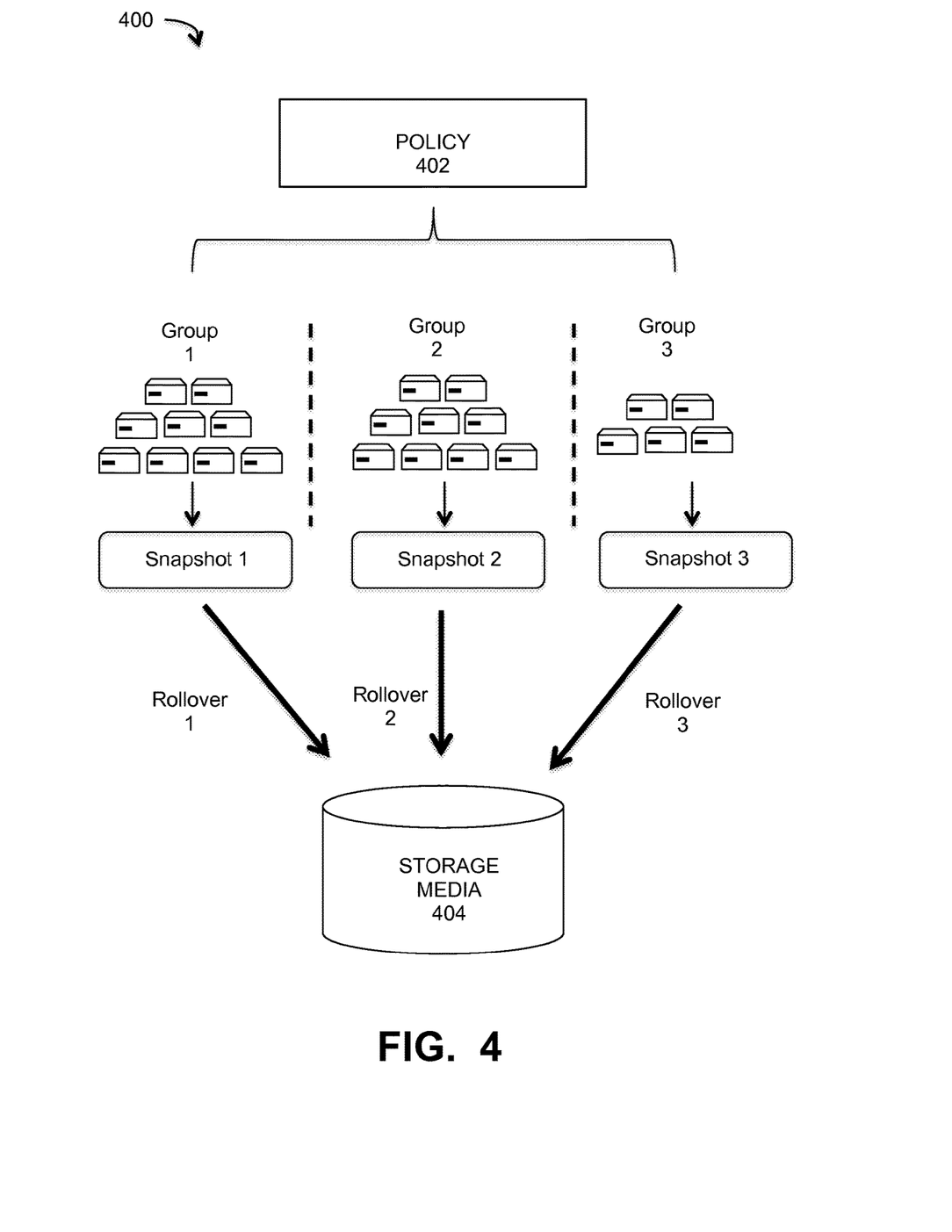
FIG. 4 is a diagram that illustrates the grouping of VMs into groups and the backing up of data in separate data rollover operations, under some embodiments.

FIG. 4 is a diagram that illustrates the grouping of VMs into groups and the backing up of data in separate data rollover operations, under some embodiments. As shown in the example embodiment of diagram 400, a defined policy 402 groups a number of VMs into three groups or subsets denoted Group 1, Group 2, and Group 3. The policy may be user-defined or dynamic depending on system constraints and application requirements. The groups may include the same or different numbers of VMs, and the division of VMs may be proportional based on an even distribution of total VMs among the groups, or they may be disproportional with different groups having different numbers of VMs, depending on the policy 402.

Snapshots are taken of each group of subset VMs, thus for the example of diagram 400, Group 1 generates Snapshot 1, Group 2 generates Snapshot 2, and Group 3 generates Snapshot 3. In general, for N groups 1-$n$ groups, N snapshots would be generated. Each individual snapshot is then saved to the storage media 404 in respective data rollover operations. A data rollover is the operation in which application data (e.g., backup metadata) is copied from the snapshot to the backup server and in which VM data from each group is written to the storage media. Thus, as shown in FIG. 4, Snapshot 1 is saved in a first rollover operation, Rollover 1, Snapshot 2 is saved in a second rollover operation, Rollover 2, and Snapshot 3 is saved in a third rollover operation, Rollover 3.

As stated above, the policy 402 defines how the total number of VMs (denoted V) is divided into a number, N, of groups or subsets. If the policy may involve determining a maximum number of VMs ($V_{max}$) that can be backed up by the VSS framework at any one time, and then to divide the total number V into equal numbers of groups where each group is at or below this maximum. Thus, in this case, each group may be of a size V/x, where x is selected such that V/x is less than or equal to $V_{max}$. For the example shown in diagram 400, each Group may be of size V/3, and the three snapshots are saved individually and separately to storage media 402 in sequential rollover operations. Alternatively, the total number of VMs may be grouped according to user-defined groupings, or dynamic groupings that are automatically defined by the server or other system component. In this case, criteria such as VM priority, content, backup speed, and other factors may be used to determine how the VMs are grouped. Other policy factors may include the condition of the VMs, such as the presence of VMs that are marginal or that are to be phased out, and other similar operational considerations. In this embodiment, it is likely that different groups will contain different numbers of VMs, but any one group should not have a number of VMs that exceeds $V_{max}$.

In an embodiment, the policy sets the number of each group to contain a number of VMs that does not exceed a threshold number that would result in a timeout error or other backup failure. The maximum number of VMs may be determined based on system knowledge and experience, such as a heuristic policy that sets a maximum number based on prior knowledge of VSS failure conditions, or OS manufacturer guidelines. Alternatively, threshold numbers may be defined, such as limiting each group to a maximum of 1000 VMs (or any other appropriate number). Further alternatively, the maximum number may be determined by way of system tests that provoke a system failure to determine how many VMs trigger a timeout (or other) error.

Figure 5:
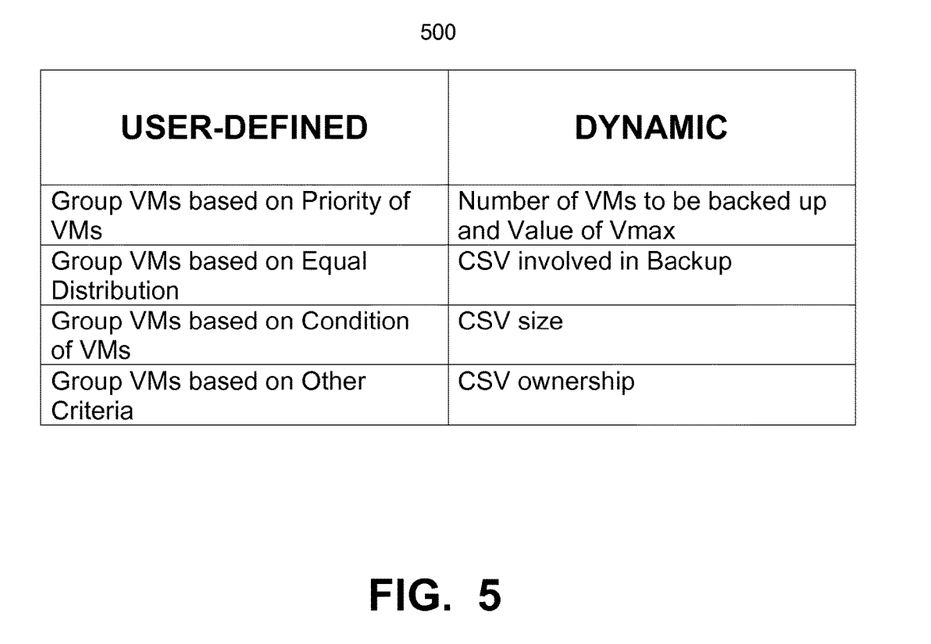
FIG. 5 is a table that illustrates defined policies for use in a VM grouping policy manager, under an embodiment.

FIG. 5 is a table that illustrates defined policies for use in a VM grouping policy manager, under an embodiment. Table 500 of FIG. 5 shows some example policies based on User-Defined policies and Dynamic (automatic) policies. The policies listed in table 500 are intended to be for example only, and other or different policies may also be used. In an embodiment, the certain dynamically set policies may be user-defined, and vice-versa. The system may also be configured to prioritize the policies based on type in the event of conflicting policies or unresolvable policies. For example, user-defined policies may be configured to take precedence over dynamic policies so that the system first checks for user-defined policies and implements those first before checking for dynamic or system-defined policies.

For use with dynamic policies the system first gets the details of the environment that is being backed up. These details include the VMs (number and identity) participating in backup, the data of these VMs, the organization the VMs in CSVs, CSV ownership by node, size of CSV disks, and other relevant VM and clustering information. If it is identified that the environment is large, such that VSS errors may result if all the VMs are attempted to be backed up at once, the system will initiate a resilient backup method using the VM grouping policy manager 213. The resilient backup method will perform the backup by splitting the backup process in to multiple snapshots depending upon a defined policy 402. This policy can be calculated dynamically by the application or could be user defined, and based on criteria such as shown in table 500.

Figure 6:
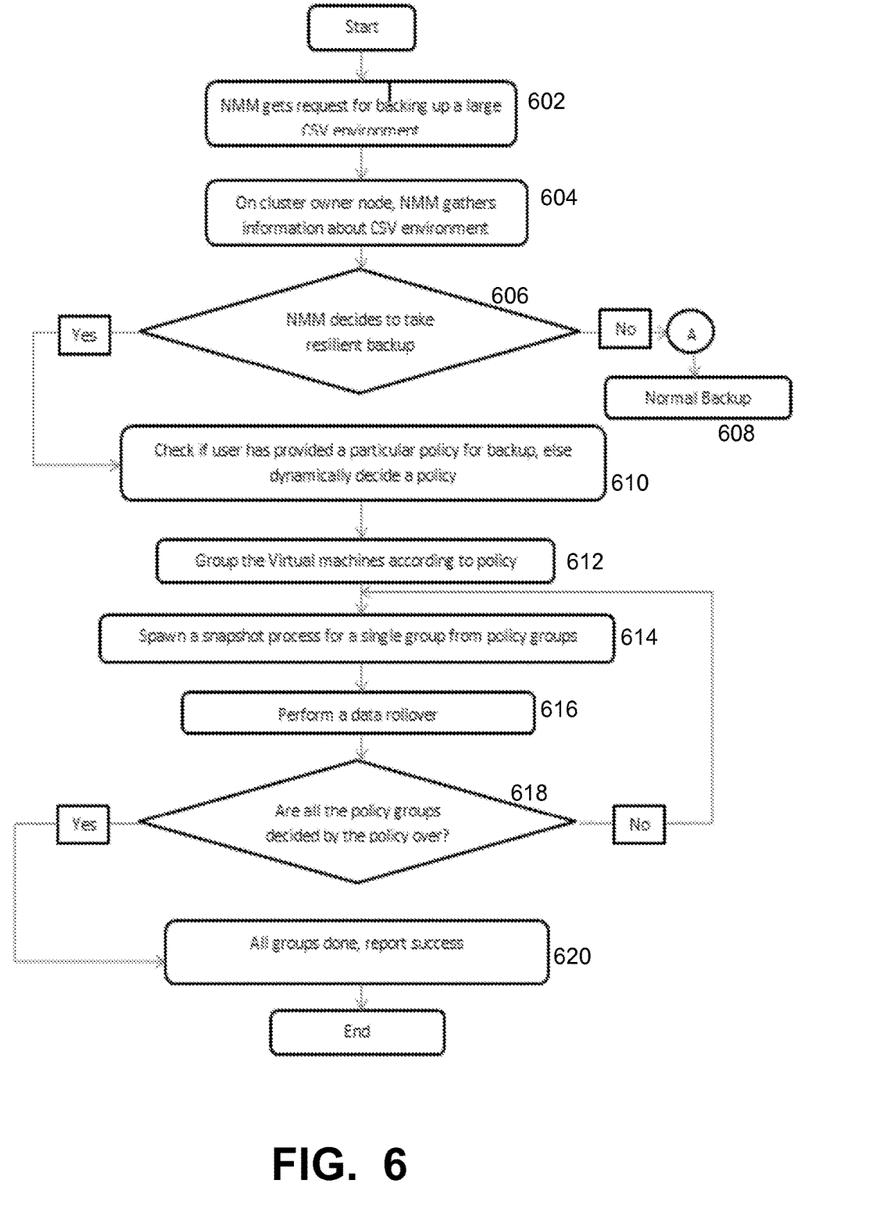
FIG. 6 is a flowchart that illustrates a method of implementing a VM grouping policy manager, under some embodiments.

FIG. 6 is a flowchart that illustrates a method of implementing a VM grouping policy manager, under some embodiments. As shown in FIG. 6, the backup agent (NMM) gets a request to perform a backup operation for a large distributed Hyper-V environment, block 602. The request to perform the backup operation lands on the cluster owner node. On the cluster owner node, NMM gathers the details of the Hyper-V environment, block 604. These details include VMs participating in backup operation, data of VMs (VM disks) on CSV, CSV owner node, size of CSV volumes, and other similar relevant information. If the number of VMs is sufficiently large, as determined in decision block 606, the NMM decides to use resilient backup method, otherwise a normal backup 608 is performed. In the case of a resilient backup, the NMM resilient backup method will check for policy that will be used to perform the backup operation. If the user has configured to employ a particular policy to perform the backup, that policy will be used otherwise it will be decided dynamically, block 610. The VMs are then grouped into the appropriate number of groups per an appropriate distribution of VMs per group, as defined by the policy, block 612. A dynamic policy used to perform backup will be based on data collected by the system, such as described above, and optimal grouping of virtual machines will be performed so as to get the fastest backup performance. The backup process will then invoke a secondary job that will perform snapshot operation group by group, block 614. When one snapshot job completes it will spawn another job to perform the data rollover operation, block 616. When the data rollover is complete, a master job will perform a snapshot of another group and again spawn a secondary job to perform rollover operation, block 616. This will continue until all the groups calculated earlier are backed up, as determined in decision block 618. After all groups are backed up, the system is successfully backed up, block 620. In this manner, all the VMs participating in the backup operation are protected and the large-scale environment with large number of CSVs is protected.

By using a policy that sets the number of each group to contain a number of VMs that does not exceed a threshold number that would result in a timeout error or other backup failure, the policy manager helps ensure that each snapshot operation for the VM subsets will succeed under the VSS framework. In certain extreme cases, it may happen that not all groups will be successfully backed up. In such a case, at least some VMs are usually backed up, thus providing partial protection that is better than the entire system failure mode of present systems. For example, if the VMs are divided into five groups and all but two groups are rolled over successfully, then there will be a backup of 3/5 groups, which may represent about 60% of the total VMs if a proportional grouping policy is used. In this case, at least some, if not most VMs are backed up and protected compared to zero VMs in present systems.

With respect to the snapshot backup used by or in conjunction with the VM grouping policy manager, different snapshot methods may be suitable for different production environments. For example, TimeFinder solution, available from EMC Corporation, Hopkinton, Mass., may be used to create snapshots. The TimeFinder solution includes various snapshot methods. One snapshot method, TimeFinder/Clone may enable the creation of a full point-in-time copy for backups. As soon as the data has been copied to the clone and split from the source, the clone may be a complete and independent physical copy of the data. Thus, the full copy may be suitable to support high I/O workloads, such as data warehouse refreshes and/or any other process that requires parallel access to production data. Clone copies may be used to reduce disk contention and improve data access speed by assigning users to copies of data rather than accessing the one production copy. Another method, TimeFinder/SNAP is a pointer-based, space-saving snapshot solution. TimeFinder/SNAP, for virtual device copy operations, may provide multiple copies of production data for testing, backups or report generation. TimeFinder/SNAP may use a copy-on-first-write technique as a way to conserve disk space when making copies. Only writes to tracks on the source device or target virtual device may cause any incremental storage to be consumed. Relative to TimeFinder/Clone, the space savings using TimeFinder/SNAP may be significant when the production applications change only a small percentage of data on a volume. In general, any snapshot process that makes point-in-time replicas or representations of the original data or contents of one or more volumes can be used, and the snapshot may be used to make an actual copy on another local and/or remote storage device; and the snapshots may be recovered at a later time by reading the data from a snapshot created at a particular point in time.

The snapshot backup methods described herein may be used to implement system backup sessions for full, incremental or differential backups or any combination of full and incremental or differential backups. A full backup backs up all files from a data source in a specified backup set or job, while an incremental backup backs up only changed and new files since the last backup. Incremental backup procedures may use a changed block tracking (CBT) feature provided by a virtual machine monitor or manager to keep track of data blocks changed since last backup. For some embodiments, one or more differential or incremental backups for Hyper-V backups in which the data to be backed up is already in a virtual disk format, such as VHD/VHDx. The incremental backup virtual disks may be created after the creation of the file that stores the full backup information of a parent volume, and the incremental backup virtual disks may store only the changed blocks in the parent volume. The set of a full backup virtual disk and one or more incremental backup virtual disks may be saved together as a single virtual disk (e.g., VHDx) in a backup disk and can be mounted for recovery. The full backups and incremental backups comprise virtual disk files, which are merged to create full or artificially synthesized full backups.

Although embodiments have been described with respect to network backup comprising certain specific technologies, such as Hyper-V servers, NMM backup agents, and CSV clusters, it should be noted that embodiments are not so limited, and that other backup systems and methods may also utilize the VM grouping policy manager methods described herein.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of backing up a large number of virtual machines in a large-scale data storage system including a backup server computer having a microprocessor and executing an operating system and accessing the virtual machines over a network, comprising:

configuring a virtual shadow copy service (VSS) as an operating system resident snapshot creation component to initiate and manage snapshot backups of the virtual machines;

accessing a defined policy defining how the virtual machines are to be grouped into a plurality of groups, wherein the virtual machines are organized as cluster shared volume (CSV) disks;

determining, as part of the defined policy, a maximum number of virtual machines that can be backed up by the VSS at any one time, wherein the maximum number is determined by at least one of prior knowledge of VSS failure conditions due to excessive numbers of backup targets, operating system guidelines, and test data indicating how many backup targets trigger the failure conditions;

dividing, by the microprocessor, a total number of virtual machines by the maximum number to derive a group size such that the group size is less than or equal to the maximum number;

grouping, in a component of the backup server computer, the plurality of virtual machines into the plurality of groups according to the defined policy, each group containing a number of virtual machines that can be backed up in a single snapshot backup operation using the VSS to ensure that a backup operation performed by the backup server computer does not fail due to the excessive number of backup targets and thereby improve efficiency of the data storage system;

taking, through the backup, a VSS snapshot backup of each group of the plurality of groups in a respective data rollover operation; and saving the snapshot backup of each group to a storage media.

2. The method of claim 1 wherein the large-scale data storage system comprises a private cloud network infrastructure.

3. The method of claim 1 wherein the snapshot comprises a point-in-time, read-only backup of one or more files or volumes on one or more virtual machines, and wherein the backup operation comprises one of a full system backup or an incremental backup.

4. The method of claim 1 wherein the defined policy comprises one of a user-defined policy, and a dynamic system-defined policy.

5. The method of claim 4 wherein the CSV disks comprise a cluster disk containing file system volumes that are made accessible for read and write operations by all nodes within a cluster, and wherein CSVs are resolved to respective cluster owner nodes.

6. The method of claim 5 wherein the snapshot backup comprises one of: a full point-in-time copy, a pointer-based snapshot, and a copy-on-first-write snapshot backup.

7. The method of claim 6 wherein the user-defined policy comprises at least one of: a priority of sets of virtual machines within a total number of virtual machines in the large-scale data storage system, and a proportional distribution scheme dividing the total number of virtual machines into approximately equal size groups.

8. The method of claim 6 wherein the dynamic policies comprise at least one of: a total number of virtual machines in the large-scale data storage system, the identity of each CSV, a size of each CSV, and an identity of the respective cluster owner nodes.

9. The method of claim 6 further comprising, prior to accessing the defined policy, determining characteristics of the large-scale backup system, the characteristics comprising: the total number of virtual machines, type and amount of data on each virtual machine, organization of the virtual machines on each CSV, the identity of each cluster owner node, and the size of the CSV volumes.

10. The method of claim 9 further comprising checking if a user-defined policy exists and executing the user-defined policy prior to a dynamic policy if so, otherwise executing the dynamic policy, wherein the dynamic policy utilizes the characteristics of the large-scale backup system.

11. The method of claim 1 wherein the snapshot backup for each group is saved to the storage media in successive rollover operations in which a previous snapshot job spawns a successive snapshot job, each snapshot job backing up a respective group.

12. A system comprising a processor-based executable module configured to back up a large number of virtual machines organized as cluster shared volume (CSV) disks in a large-scale data storage system comprising a backup server having a microprocessor and a executing an operating system, comprising:
   a virtual shadow copy service (VSS) configured as an operating system resident snapshot creation component to initiate and manage snapshot backups of the virtual machines;
   a policy manager component of the backup server computer, storing a policy defining how the virtual machines are to be grouped into a plurality of groups;
   a component determining, as part of the defined policy, a maximum number of virtual machines that can be backed up by the VSS at any one time, wherein the maximum number is determined by at least one of prior knowledge of VSS failure conditions due to excessive numbers of backup targets, operating system guidelines, and test data indicating how many backup targets trigger the failure conditions;
   a microprocessor component dividing a total number of virtual machines by the maximum number to derive a group size such that the group size is less than or equal to the maximum number, wherein the group size is derived to ensure that a backup operation performed by the backup server computer does not fail due to the excessive number of backup targets and thereby improve efficiency of the data storage system;
   a backup component of the backup server computer taking a VSS snapshot backup of each group of the plurality of groups in a respective data rollover operation; and
   a storage media interface component saving the snapshot backup of each group to a storage media.

13. The system of claim 12 wherein the snapshot backup for each group is saved to the storage media by the backup component in successive rollover operations in which a previous snapshot job spawns a successive snapshot job, each snapshot job backing up a respective group.

14. The system of claim 12 wherein the CSV disks comprise a cluster disk containing file system volumes that are made accessible for read and write operations by all nodes within a cluster, and wherein CSVs are resolved to respective cluster owner nodes.

15. The system of claim 14 wherein the defined policy comprises one of a user-defined policy, and a dynamic system-defined policy, and wherein the user-defined policy comprises at least one of: a priority of sets of virtual machines within a total number of virtual machines in the large-scale data storage system, and a proportional distribution scheme dividing the total number of virtual machines into approximately equal size groups, and further wherein the dynamic policies comprise at least one of: a total number of virtual machines in the large-scale data storage system, an identity of each CSV, a size of each CSV, and an identity of the respective cluster owner nodes.

16. The system of claim 15 wherein the policy manager component determines characteristics of the large-scale backup system, the characteristics comprising: the total number of virtual machines, type and amount of data on each virtual machine, organization of the virtual machines on each CSV, the identity of each cluster owner node, and the size of the CSV volumes.

17. The system of claim 16 wherein the policy manager component is configured to first check if a user-defined policy exists and execute the user-defined policy prior to a dynamic policy if so, otherwise it is configured to execute the dynamic policy, wherein the dynamic policy utilizes the characteristics of the large-scale backup system.

18. The system of claim 12 wherein the large-scale data storage system comprises a deduplication data backup system utilizing a hypervisor to expose the virtual machines to one or more networks.

19. The system of claim 18 wherein the snapshot comprises a point-in-time, read-only backup of one or more files or volumes on one or more virtual machines, and wherein the backup operation comprises one of a full system backup or an incremental backup.

20. A computer program product, comprising a non-transitory computer-readable medium having a computer-readable program code embodied therein, the computer-readable program code adapted to be executed by one or more processors to implement a method for backing up a large number of virtual machines in a large-scale data storage system including a backup server computer having a microprocessor and executing an operating system and accessing the virtual machines over a network, by:
   configuring a virtual shadow copy service (VSS) as an operating system resident snapshot creation component to initiate and manage snapshot backups of the virtual machines;
   accessing a defined policy defining how the virtual machines are to be grouped into a plurality of groups, wherein the virtual machines are organized as cluster shared volume (CSV) disks;
   determining, as part of the defined policy, a maximum number of virtual machines that can be backed up by the VSS at any one time, wherein the maximum number is determined by at least one of prior knowledge of VSS failure conditions due to excessive numbers of backup targets, operating system guidelines, and test data indicating how many backup targets trigger the failure conditions;

dividing, by the microprocessor, a total number of virtual machines by the maximum number to derive a group size such that the group size is less than or equal to the maximum number;

grouping, in a component of the backup server computer, the plurality of virtual machines into the plurality of groups according to the defined policy, each group containing a number of virtual machines that can be backed up in a single snapshot backup operation using the VSS to ensure that a backup operation performed by the backup server computer does not fail due to the excessive number of backup targets and thereby improve efficiency of the data storage system;

taking, through the backup, a VSS snapshot backup of each group of the plurality of groups in a respective data rollover operation; and saving the snapshot backup of each group to a storage media.

* * * * *